May 31, 1938.  H. HIRTH  2,119,104
ENGINE STRUCTURE
Filed Aug. 28, 1936  3 Sheets-Sheet 1

Inventor
Hellmuth Hirth
by Karl ———
Atty.

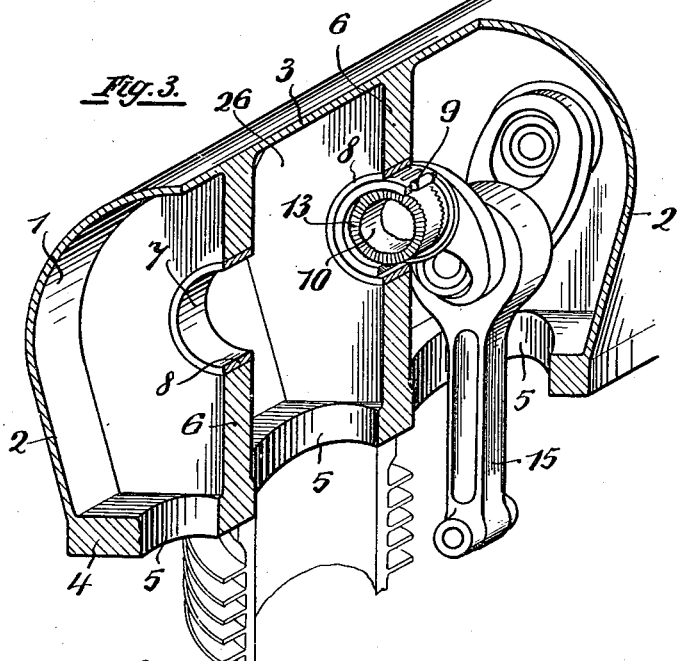
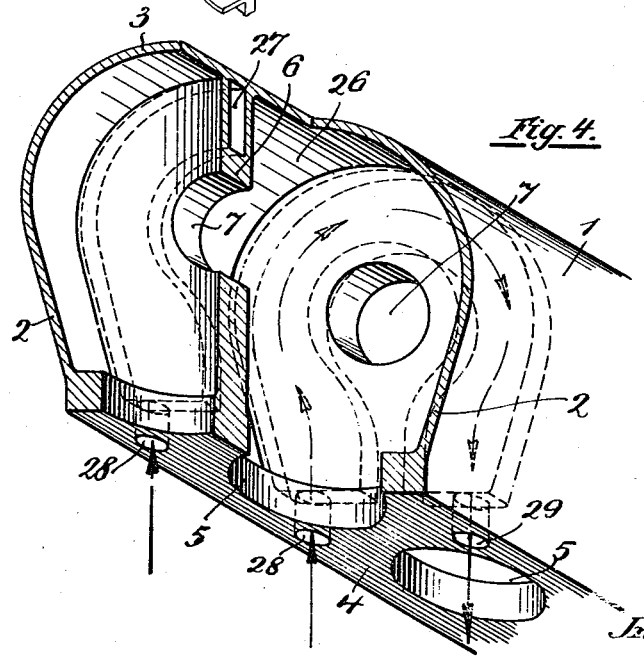

Patented May 31, 1938

2,119,104

UNITED STATES PATENT OFFICE 2,119,104

ENGINE STRUCTURE

Hellmuth Hirth, Stuttgart-Zuffenhausen, Germany, assignor to Hirth-Motoren G. m. b. H., Stuttgart-Zuffenhausen, Germany Application August 28, 1936, Serial No. 98,309
In Germany September 2, 1935

2 Claims. (Cl. 121—194)

My invention relates to internal combustion engines and more especially to light weight engines for motor vehicles and air craft. It has particular reference to the crank cases of such engines and it is one of the objects of my invention to provide a crank case which is lighter in weight and stronger than the crank cases of light weight engines hitherto devised.

As is well known, the weight of the crank case of a light weight engine forms a considerable proportion of the total weight of the engine, since the casings, as hitherto designed, are made in several parts and therefore require corresponding means for the connection of these parts. Obviously the weight of the crank case can be greatly diminished if it can be made all in one piece, but with crank shafts of the ordinary kind this is impossible, since these shafts must be inserted in the case in fully assembled condition.

The crank case according to the present invention is intended quite particularly for use in combination with a composite crank shaft and forms a self-contained casting and is formed only on one side with openings for the fixing of the cylinders. Through these openings the several parts forming the composite crank shaft can be introduced into the case one after the other and are then assembled.

I thus obtain a crank case of great solidity and very simple construction, which is distinguished by the lowest possible weight in combination with a mechanical strength such as has hitherto not been attained.

If applying this invention to internal combustion engines, the new crank case has a cross section resembling U-shape with the lateral faces converging towards the cylinders, the openings provided in the wall of the crank case for the connection with the cylinders at the same time serving for introducing and assembling the several parts of the crank shaft and bearings. Obviously, in order to facilitate the assembling, auxiliary openings for the introduction of parts or tools may also be provided in other places of the case. The bearings are supported in corresponding partitions of the case, which subdivide it into separate chambers.

I prefer combining the new crank case with the well known composite crank shaft of my own design, which can be assembled within the case merely with the aid of spanners without requiring any expenditure of force. However, such a crank case may also be combined with other types of composite crank shafts.

The new crank case forms a hollow body, the end faces and partitions of which are formed with borings to support bearings of a diameter corresponding to the stress exerted thereon by the shaft. The diameter of the bearings need not be made larger, but may correspond exactly to the stresses. I may use either friction bearings or antifriction bearings.

I have found it particularly advantageous to form the new crank case with double walls, which offer the possibility of introducing between the walls a cooling medium such as air or a liquid. It is particularly useful to form the partitions with double walls, since I am thus enabled to cool the bearings in a particularly efficient manner.

Obviously, the new type of crank case is not limited to the application to one row cylinder engines, but is also applicable to all other kinds of cylinder arrangements.

In the drawings affixed to this specification and forming part thereof, several embodiments of my invention are illustrated diagrammatically by way of example.

In the drawings,

Fig. 3 is a perspective view, drawn to a larger scale and partly in axial and cross sections, of such crank case, and Fig. 4 is a similar view, viewed in a different direction, of a similar crank case, in which the partitions are hollow.

Figure 1:
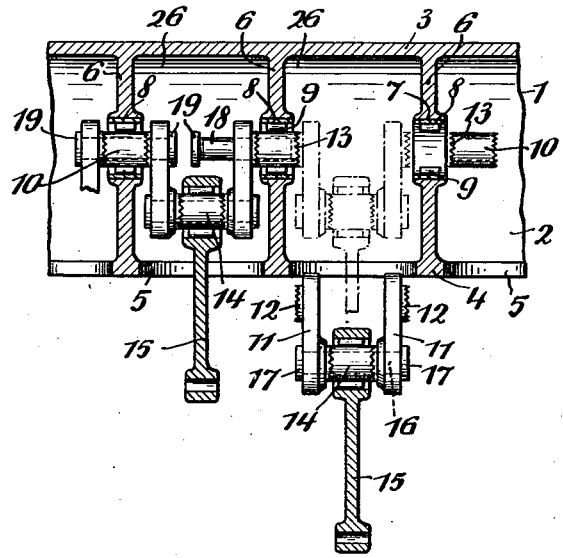
Fig. 1 is an axial section of the crank case of a multicylinder engine with parts of a composite crank shaft shown in the course of assemblage.
Figure 2:
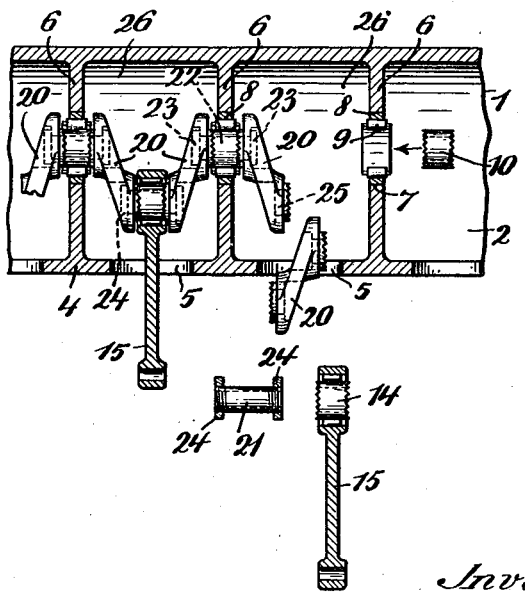
Fig. 2 is a similar view showing a modified form of crank shaft.
Figure 5:
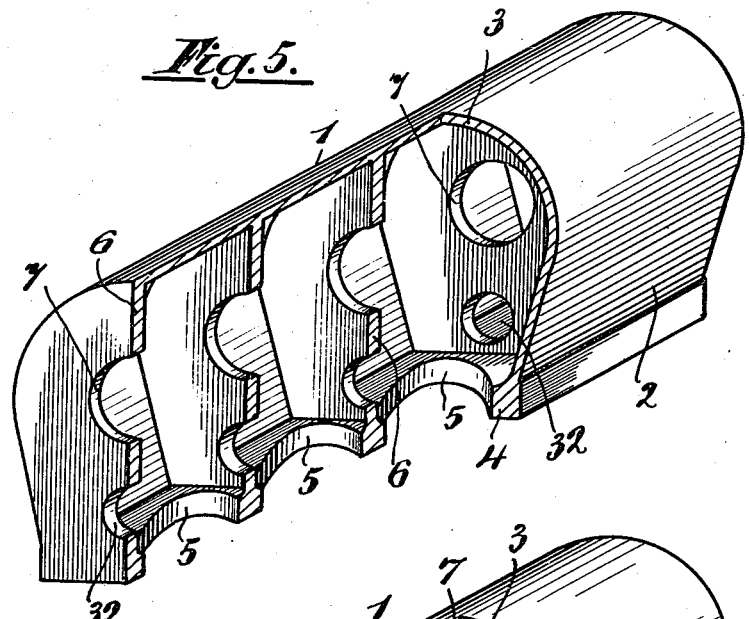
Figs. 5 and 6 are perspective views, partly in section, of two further modifications, the case of Fig. 5 being formed with a single, the case of Fig. 6 with a double outer wall.

Referring to the drawings and first to Figs. 1 to 3, 1 is the outer wall of the crank case, and 2 are the side walls converging towards each other, while opposite the arcuate part of the casing wall extends the wall 4 connecting the side walls 2, which is formed with openings 5 serving to attach the cylinders and to introduce the crank shaft and bearings. 6 are the partitions supporting the bearings and the shaft in borings 7. 8 are the bearing rings, 9 the roller bearings, 10 the inner races. In assembling a composite crank shaft in a crank case of this kind, as illustrated for instance in Fig. 1, which shows a crank case for large cylinder units, two inner races 10 are first inserted in the adjoining bearings. Thereafter the crank arms 11 formed with teeth 12 and the connecting rods 15 supported by the race 14 forming the crank pin are introduced together with the bolt 16 and nut 17 into the crank case through the openings 5. Now the main bearing rings 10 are shifted in their bearings towards the two crank arms 11 until their teeth 13 are interlocked with the teeth 12 of the crank arms. The arms 11 are held together with the inner races 10 by bolts 18 and nuts 19.

In Fig. 1, a pair of crank arms with the connecting rod associated with them is shown in the course of being introduced into the crank case, while another combination of similar parts is shown on the left in position in the case. The modification of Fig. 2 differs from that shown in Fig. 1 in that the crank shaft is formed with converging arms 20, whereby the shaft is made more rigid. The connecting rod 15 is here mounted on a race 14 supported by a bolt 21, on which are also mounted the arms 20, nuts 24 serving to hold the parts 20, 14, 20 together.

Here the parts of each unit of crank arms and connecting rod are singly introduced through the narrow openings 5 to be assembled only within the casing. First of all the rings 8 and roller bearings 9 are mounted in the borings 7 of the partitions. Now the crank arms 20 to be mounted on the left and right hand sides of the partition 6 are introduced through the openings 5 and a bolt 22 is passed through them, on which are fixed the nuts 23, whereby the inner race 10 is held together with the arms 20. Now the bolt 21 is passed through the boring 25 of the crank arm 20, until it meets the partition 6. Now the race 14 is introduced, on which the connecting rod 15 may already be mounted, and the bolt 21 is now shifted until the right-hand crank arm 20 can be mounted thereon. Now the nuts 24 are screwed down on the bolt, whereby the several parts are fixed to each other. Now the inner race 10 shown on the right-hand side of Fig. 2 is shifted into the bearing 9 in the direction of the arrow and a bolt 22 is passed from the left through the arm 20 and the race 10, so the now a crank arm unit with the connecting ro belonging to it is accommodated in one of th cells 26 enclosed between adjoining partitions In both these modifications the races 10 an 14 as well as the crank arms 11 and 20 are forme with teeth, which on the nuts 17, 19 and 23, ? being screwed home, are made to interlock in suc manner, that the several parts of which th crank shaft is composed, are connected to for a rigid body.

Obviously, instead of combining the case wit the crank shaft formed with coupling teeth, als other composite crank shafts may be combine with it.

Figure 6:
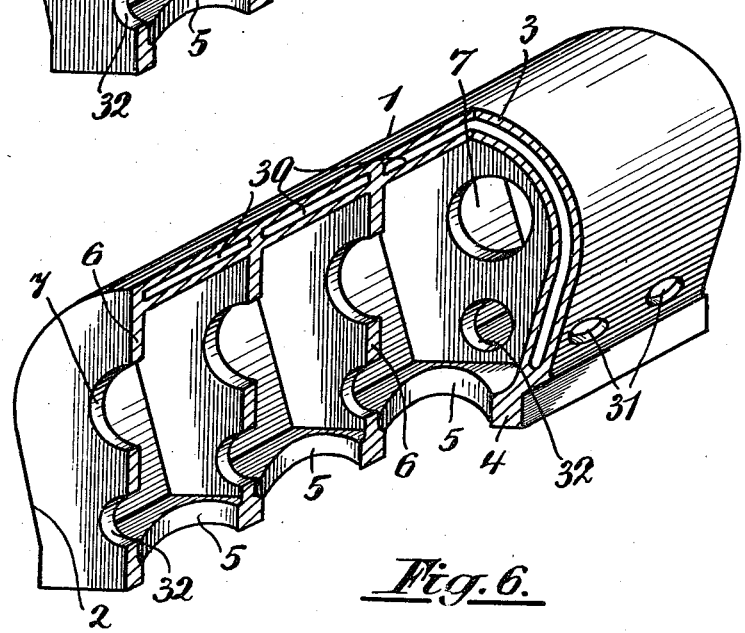

I may form the crank case, either in part o throughout, with double walls, thereby obtainin the advantage of being able to introduce betwee the walls a cooling agent such as air or a liqui As shown in Fig. 4, which illustrates a particu larly satisfactory design, the partitions 6 ar formed with double walls enclosing conduits 2 with intake and exhaust ports 28 and 29, respec tively, for the cooling agent, which travels in th direction of the arrows. I may however also forr the outer wall of the crank case with double wall forming a cooling jacket 30 with openings 31 fo the introduction of the cooling agent (Fig. 6).

Obviously, the conduits 27 and 30 may als serve for the circulation of other materials.

I wish it to be understood that I do not desir to be limited to the exact details of constructio shown and described for obvious modification will occur to a person skilled in the art.

I claim:—

1. A crank case for the crank shaft of an in ternal combustion engine comprising a substan tially closed case body consisting of a curve shell and end walls made all in one piece, sai case being merely formed with openings for th introduction of the bearings and the parts of composite crank shaft, a partition in the cas subdividing same into a plurality of chambers.

2. The crank case of claim 1, in which the par titions are hollow to serve for cooling the bear ings.

HELLMUTH HIRTH.